(12) United States Patent
Pinney et al.

(10) Patent No.: US 8,559,045 B2
(45) Date of Patent: Oct. 15, 2013

(54) SMALL AIO (ALL IN ONE) PRINTER THAT USES EXTERNAL STORAGE FOR THE PURPOSE OF PAPER COLLATION

(71) Applicant: Konica Minolta Laboratory U.S.A., Inc., San Mateo, CA (US)

(72) Inventors: Shaun Pinney, Fremont, CA (US); Hao Hu, Belmont, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/656,310

(22) Filed: Oct. 19, 2012

(65) Prior Publication Data

US 2013/0050762 A1 Feb. 28, 2013

Related U.S. Application Data

(62) Division of application No. 12/750,910, filed on Mar. 31, 2010.

(51) Int. Cl.
*G06F 3/12* (2006.01)

(52) U.S. Cl.
USPC ......................... 358/1.15; 358/1.16

(58) Field of Classification Search
USPC ................................................ 358/1.16, 1.15
See application file for complete search history.

(56) References Cited

U.S. PATENT DOCUMENTS

| | | | |
|---|---|---|---|
| 7,729,003 B2* | 6/2010 | Kasamatsu | 358/1.16 |
| 2003/0184803 A1 | 10/2003 | Yamada et al. | |
| 2003/0206315 A1 | 11/2003 | Lester et al. | |

* cited by examiner

*Primary Examiner* — Qian Yang
(74) *Attorney, Agent, or Firm* — Buchanan Ingersoll & Rooney PC

(57) ABSTRACT

A method implemented in a data processing system including an image forming apparatus for producing a print job, which includes the steps of: (a) receiving data representing a document to be printed in the print job; (b) receiving job information about the print job; (c) determining if the job information includes an instruction to print multiple copies of the document in a collated order; (d) forwarding the data representing the document to be printed in the print job to an external storage unit when multiple copies of the document in collated order have been requested; (e) retrieving the data from the external storage unit; and (f) printing the multiple copies of the document in collated order.

15 Claims, 7 Drawing Sheets

SMALL AIO (ALL IN ONE) PRINTER THAT USES EXTERNAL STORAGE FOR THE PURPOSE OF PAPER COLLATION

This application is a divisional of application Ser. No. 12/750,910, filed on Mar. 31, 2010. The entire content of the prior application is incorporated herein by reference.

FIELD OF THE INVENTION

The present invention relates to a method or process, a computer readable medium, and an image forming apparatus, and more particularly to multi-functional printers (MFP), all-in-one (AIO) printers and the like having limited internal memory, and which provides for collation of a print job by using an external storage unit or device.

BACKGROUND OF THE INVENTION

Multi-functional printers (multi-functional peripherals), which are also known as MFPs, and all-in-one printers (AIO) provide a plurality of functions, such as a printer function, a scanner function, and a copy function. Efforts are continually being made to expand the number of features for such devices, while at the same time maintaining quality and reducing their cost.

One such feature is collation, where multiple copies of a single document are printed out in the document's page order. For collation, the printed sheets eject in order from the first page of the document to the last page for the first full copy, and then from the first page to the last page again for the second full copy, etc., repeating the process each time for every full copy requested by the user.

From the above description of collation, it can be appreciated that each page is loaded into printer storage as it arrives, and will remain in printer storage until the last copy of the page has ejected. As a result of the printing order for collation this also means that after all pages have arrived, then all pages are held in storage at the same time when multiple full copies are requested. Thus, storage must be large enough to hold all pages of a job to support collation. But for certain jobs requiring collation, such as copy jobs, the pages can be quite large and the printer's internal memory may not be large enough to support collation, even when data compression techniques are used.

Because of storage limitations, collation is not always possible for all jobs without installing dedicated storage hardware such as an internal hard disk. But since adding additional internal storage increases the overall cost of the printer, it is desirable to find a low-cost solution which supports full collation without adding additional internal storage. The solution proposed here takes advantage of the fact that existing storage needed for collation is often available externally, such as through a network, rather than internally as part of the printer hardware. Since using existing external storage provides the storage needed for collation without incurring any additional hardware costs for internal hard drives, it is an ideal solution for providing full collation support while minimizing overall printer cost.

It is useful to note that external storage may also be used by printers for other purposes and during other processes than the collation process. For example, storage is required for certain jobs such as PDF and XPS printing because they require all job data to arrive first and be fully placed into storage before page rendering can begin, regardless of whether copy or collation processing is requested.

To hold these types of incoming jobs, a printer's internal memory also may not provide enough storage and so external storage may be used to increase the amount of storage available beyond that provided by the printer's internal memory. However, the application of external storage listed for the PDF/XPS example above and in the general case stands in contrast to the idea proposed here which is to use external storage to store the image data which is input to the collation process.

In summary for the collation feature, many low-cost printers including all-in-ones (AIO) and multi-functional peripherals (MFP) cannot provide the full collation feature for large jobs without the additional cost of an internal hard disk or additional internal memory and storage. Accordingly, it would be desirable to have an image forming apparatus in the form of a multi-functional peripheral (MFP) or all-in-one (AIO) unit that can leverage external storage units or systems to provide the image forming apparatus with full collation capabilities when copy collation is requested within the job data.

OBJECTS AND SUMMARY

The present invention has been made in consideration of the above issues, and provides an improved image forming apparatus and method, especially for a limited memory environment by performing collation using an external storage system or unit.

In accordance with an exemplary embodiment, a method implemented in a data processing system including an image forming apparatus for producing a print job, comprises: (a) receiving data representing a document to be printed in the print job; (b) receiving job information about the print job; (c) determining if the job information includes an instruction to print multiple copies of the document in a collated order; (d) forwarding the data representing the document to be printed in the print job to an external storage unit when multiple copies of the document in collated order have been requested; (e) retrieving the data from the external storage unit; and (f) printing the multiple copies of the document in collated order.

In accordance with another exemplary embodiment, a method implemented in a data processing system including an image forming apparatus for producing a print job, comprises: (a) receiving data representing a document to be printed in the print job; (b) receiving job information about the print job, the job information including an instruction to print multiple copies of the document in a collated order; (c) forwarding the data to an external storage unit when an internal memory of the image forming apparatus does not have sufficient memory to store the data representing the print job; (d) retrieving the data from the external storage unit; and (e) printing the multiple copies of the document in collated order.

In accordance with a further exemplary embodiment, a computer program product comprising a non-transitory computer usable medium having a computer readable code embodied therein for controlling an image forming apparatus, the computer readable program code configured to cause the image forming apparatus to execute a process for producing a print job, the process comprises the steps of: (a) receiving data representing a document to be printed in the print job; (b) receiving job information about the print job; (c) determining if the job information includes an instruction to print multiple copies of the document in a collated order; (d) forwarding the data representing the document to be printed in the print job to an external storage unit when multiple copies of the document in collated order have been requested; (e)

retrieving the data from the external storage unit; and (f) printing the multiple copies of the document in collated order.

In accordance with another exemplary embodiment, an image forming apparatus comprises: a memory unit, the memory unit having a firmware application which performs the following steps: (a) receiving data representing a document to be printed in the print job; (b) receiving job information about the print job; (c) determining if the job information includes an instruction to print multiple copies of the document in a collated order; (d) forwarding the data representing the document to be printed in the print job to an external storage unit when multiple copies of the document in collated order have been requested; and (e) retrieving the data from the external storage unit; and a print engine for printing multiple copies of the document in collated order from the data representing the document to be printed in the print job.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
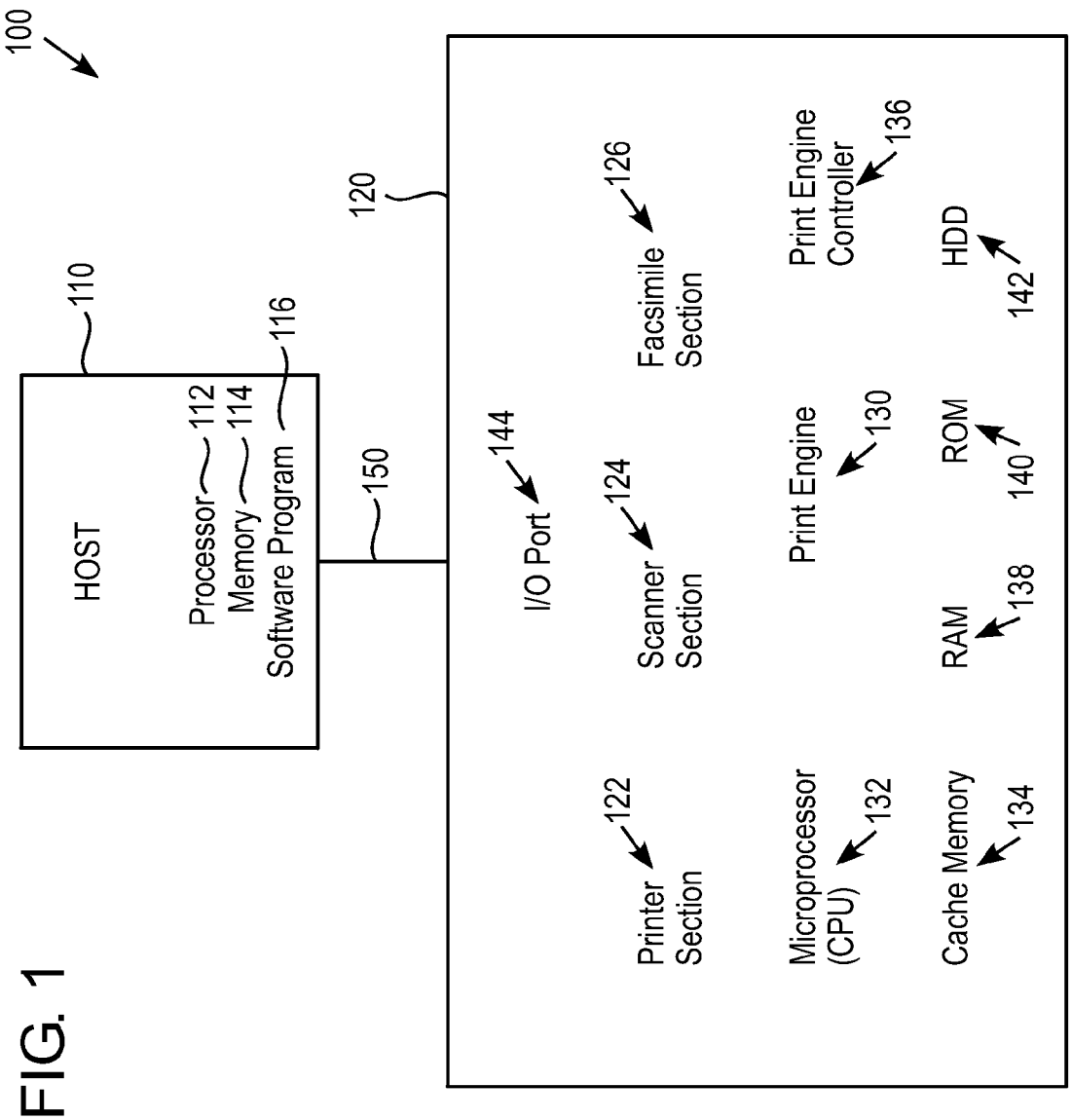
FIG. 1 is a diagram of a data processing system, which includes a host computer and an image forming apparatus connected to the host computer in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

The methods described herein can be implemented in a data processing system 100 which includes a host (or client device) 110 and an image forming apparatus (or printer) 120 connected to the host 110. A typical structure of the data processing system is shown in FIG. 1. The host 110 includes a processor 112 and one or more memories 114 for storing software programs 116 and data (such as files to be printed). The host 110 submits print jobs to the image forming apparatus or printer 120 by transmitting data representing the documents to be printed and information describing the print job. In accordance with an exemplary embodiment, the host 110 is personal computer or computer.

In accordance with an exemplary embodiment, the image forming apparatus (or printer) 120 is configured as a multi-functional peripheral (MFP) device or all-in-one (AIO) that includes a printer section 122 for converting print data inputted from outside to image data and forming and printing out the converted image onto a sheet, a scanner section 124 for optically reading a document, and a facsimile section 126 for facsimile receiving and transmitting image data to and from external apparatuses through public lines.

The printer section 122 carries out a function for forming and outputting an image corresponding to the image data onto the recording sheet using an electro-photographic process. In accordance with an exemplary embodiment, the printer section 122 is configured as a so-called laser printer having a recording sheet conveying device (not shown in the drawing), a photoreceptor drum, a charging unit, an LD (Laser Diode) corresponding to the image data inputted, a scanning unit for scanning the laser light irradiated from the LD on the photoreceptor drum, a developing unit, a transfer and separation unit, a cleaning unit, and a fixing unit.

The scanner section 124, which includes a copying section, carries out a function to read a document and obtain the image data and comprises a light source for irradiating the document, a CCD (Charge Coupled Device) image sensor for reading the document by one line at a time in a width direction, and an A/D converter for converting an analogue image signal outputted by the image sensor to digital image data. Although not shown in the drawing, the scanner section 124 further comprises a moving mechanism for moving the reading position per one line of the image sensor in a longitudinal direction of the document and optical parts comprising a lens and a mirror for guiding the reflected light from the document and focusing image on the image sensor.

The facsimile section 126 connects to a public line (not shown) and has a function to compress and expand the image data with the compression mode complying with facsimile, and a function to control various communication protocols for sending and receiving facsimile through the public line.

The image forming apparatus 120 includes a print engine 130, which is controlled by a microprocessor (or CPU) 132. The microprocessor 132 communicates with other elements of the system and includes a cache memory 134. A print engine controller (or printer controller) 136 and the associated print engine 130 provides the print output capability for the printer section 122. A random access memory (RAM) 138 provides a main memory for the printer section 122 for storing and processing a print job data stream received from the client device or host computer 110. A read only memory (ROM) 140 and Hard Disk Drive (HDD) 142 holds firmware which controls the operation of microprocessor 132 and print engine 130. Here, the firmware includes software applications for executing basic controls of various hardware of the image forming apparatus 120, and an embedded Operating System (OS), which controls the operation of the image forming apparatus 120. Code procedures stored in memory (ROM) 140 include, for example, a page converter, rasterizer, compression code, page print scheduler and print engine manager.

An input/output (I/O) port 144 provides communications between the printer section 122 and the host (or client device)

110 and receives page descriptions (or print data) from the host for processing within the image forming apparatus 120. In accordance with an exemplary embodiment, the operation of printer section 122 commences when it receives a page description from the host (or client device) 110 via I/O port 144 in the form of a print job data stream.

In accordance with an exemplary embodiment as shown in FIG. 1, the image forming apparatus (or printer) 120 and the host (or client device) 110 are connected to each other via a network (e.g., LAN or WAN) 150. In accordance with an exemplary embodiment, the image forming apparatus 120 receives a print job from the client device 110, which is then printed onto at least one sheet of paper and/or other printable medium. Examples of the network consistent with embodiments of the invention include, but are not limited to, the Internet, an intranet, a local area network (LAN) and a wide area network (WAN). The image forming apparatus 120 and the host (or client device) 110 can be connected with a wire or be connected with wireless by using radio frequency (RF) and/or infrared (IR) transmission. Examples of image forming apparatuses 120 consistent with exemplary embodiments of the invention include, but are not limited to, a laser beam printer (LBP), an LED printer, a multi-functional laser beam printer including copy function (MFP). In accordance with an exemplary embodiment, the image forming apparatus 120 is preferably a color printer or a black and white (B/W) printer.

Figure 2:
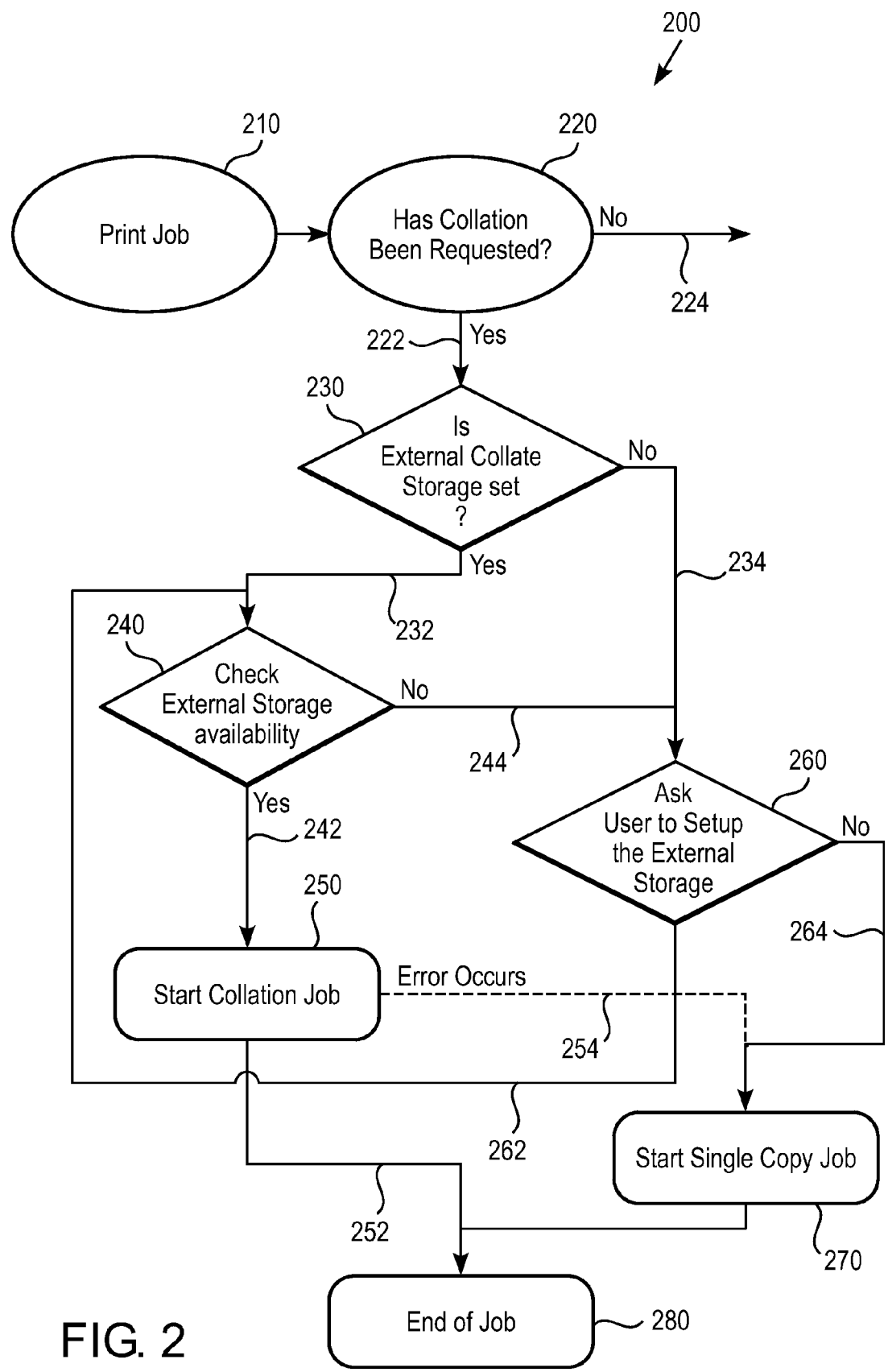
FIG. 2 is a flow chart of an image forming apparatus having full collation by using an external storage system in accordance with an exemplary embodiment.

FIG. 2 is a flow chart of a method implemented in a data processing system including an image forming apparatus for producing a print job 200 in accordance with an exemplary embodiment. As shown in FIG. 2, in step 210, the image forming apparatus receives a print job, which includes data representing a document to be printed in the print job and job information about the print job. In step 220, a determination is made, if the job information includes an instruction to print multiple copies of the document in a collated order (i.e., collation). When multiple copies of the document in collated order have been requested, the data representing the document to be printed in the print job is forwarded to an external storage unit (Step 222). Alternatively, if the answer is no, (i.e., no collation) the data representing the print job is sent via step 224 to the print controller for printing of the non-collated print job.

It can be appreciated that in accordance with an embodiment, the data for the entire print job is forwarded to an external storage unit without regard to available memory within the image forming apparatus. The data and the job information can be received from a host computer connected to the image forming apparatus (i.e., collated print, which can be a user set option on the printer driver), or alternatively, an original hard copy of the document on the image forming apparatus to generate the data representing the document to be printed, and the job information can be received from an input panel of the image forming apparatus (i.e., collated copy, which can be a user set option on the OCP Panel).

As set forth above, based upon the determination that the job information includes a request to print multiple copies of the document, the entire the print job is sent via step 222 to the firmware of the image forming apparatus to ascertain in step 230, if an external storage unit (or external collate storage device) has been set (i.e., pre-selected) for the image forming apparatus. If, an external storage unit has been pre-selected by the image forming apparatus, the print job data is sent via step 232 to the external storage unit or device where the available external storage (or memory) within the external storage unit or device is checked, step 240. If the external storage unit has available storage, the print job data is sent to the external storage unit in step 242, where the print job data is stored until the entire print job data has been received. Once the entire print job has been transferred to the external storage unit, the data from the external storage unit is sent to the printer controller, so that the multiple copies of the document can be printed in step 250.

If an external storage unit or device has not be pre-selected or set within the firmware of the image forming apparatus, in step 234, the user is asked in step 260 to select an external storage unit. In accordance with an exemplary embodiment, the external storage unit is selected from at least one and/or one or more external storage units available to the image forming apparatus. The selection of the external storage unit is preferably performed by a software wizard or other suitable method. Once the external storage unit has been selected, in step 262, the print job data is sent to the external storage unit or device where the available external storage within the external storage unit or device is checked, step 240. If the external storage unit has available storage, the print job data is sent to the external storage unit in step 242, where the print job data is stored until the entire print job data has been received. Alternatively, if the external storage unit does not have the capacity or available memory, in step 244, the user will be asked to select an alternative external storage unit. Once the entire print job has been transferred to the external storage unit, the data from the external storage unit is sent to the printer controller so that the multiple copies of the document can be printed, step 250.

In accordance with an exemplary embodiment, if an external storage unit is not available, or alternatively, the external storage unit does not have available memory to store the data for the print job, in step 264, a single copy and/or print job is preformed. In addition, if an error is detected upon printing of the collated job, in step 254, the firmware will print a single copy of the print job. Once the collation print job (step 252) or the single print job (step 272) has been completed, the print job is completed (step 280), i.e., end of job.

Figure 3:
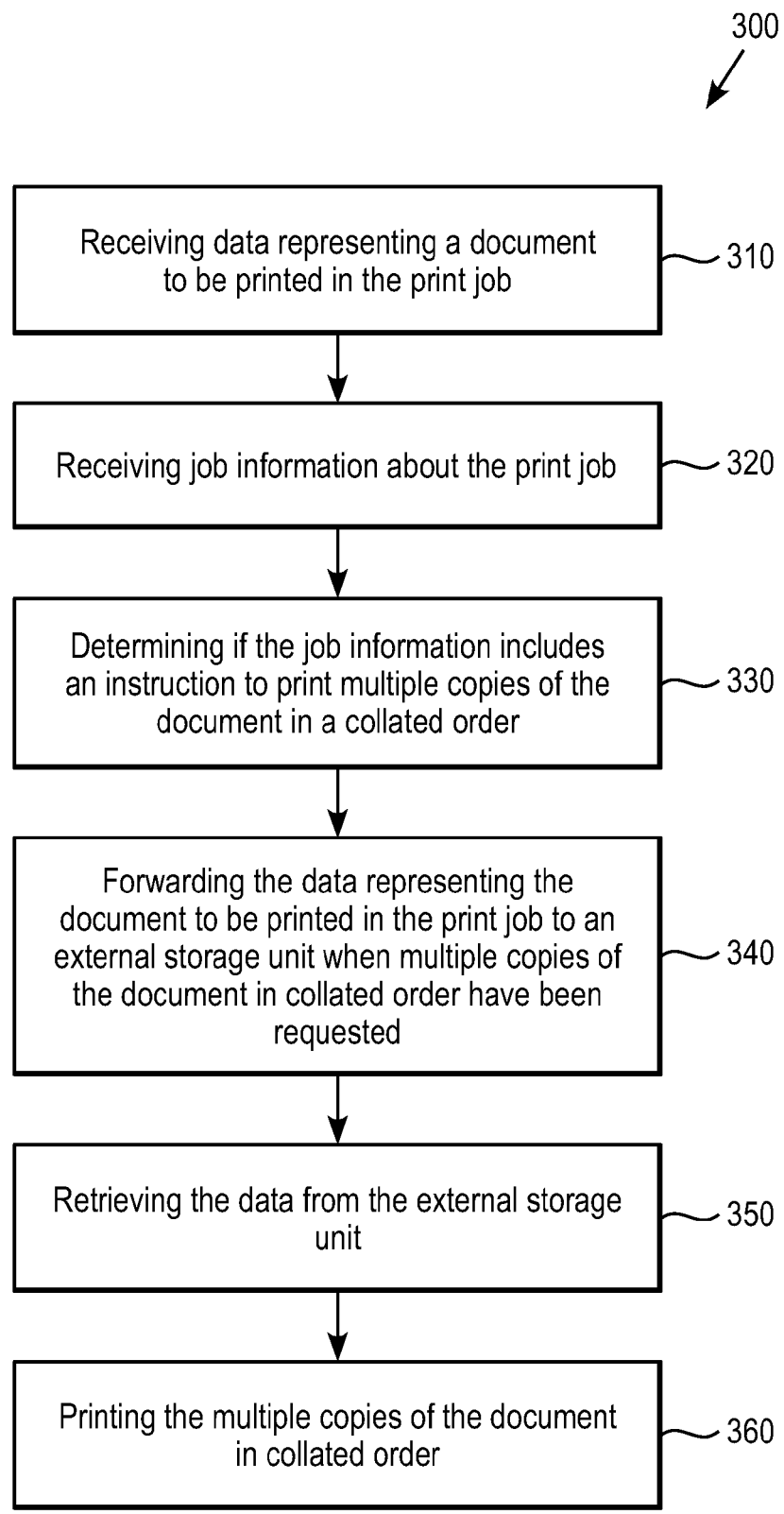
FIG. 3 is a flow chart of an image forming apparatus having full collation by using an external storage system in accordance with another exemplary embodiment.

In accordance with an exemplary embodiment as shown in FIG. 3, a method implemented in a data processing system including an image forming apparatus for producing a print job 300, comprises the steps of (a) receiving data representing a document to be printed in the print job 310; (b) receiving job information about the print job 320; (c) determining if the job information includes an instruction to print multiple copies of the document in a collated order 330; (d) forwarding the data representing the document to be printed in the print job to an external storage unit when multiple copies of the document in collated order have been requested 340; (e) retrieving the data from the external storage unit 350; and (f) printing the multiple copies of the document in collated order 360.

It can be appreciated that as shown in FIG. 3, that upon receipt of the instruction to print multiple copies of the document (i.e., collation), the image forming apparatus forwards the entire print job to an external storage unit. In accordance with an exemplary embodiment, the forwarding of the entire print job to the external storage unit is without regard to the amount of available memory within the internal storage portion (or memory) of the image forming apparatus.

Figure 4:
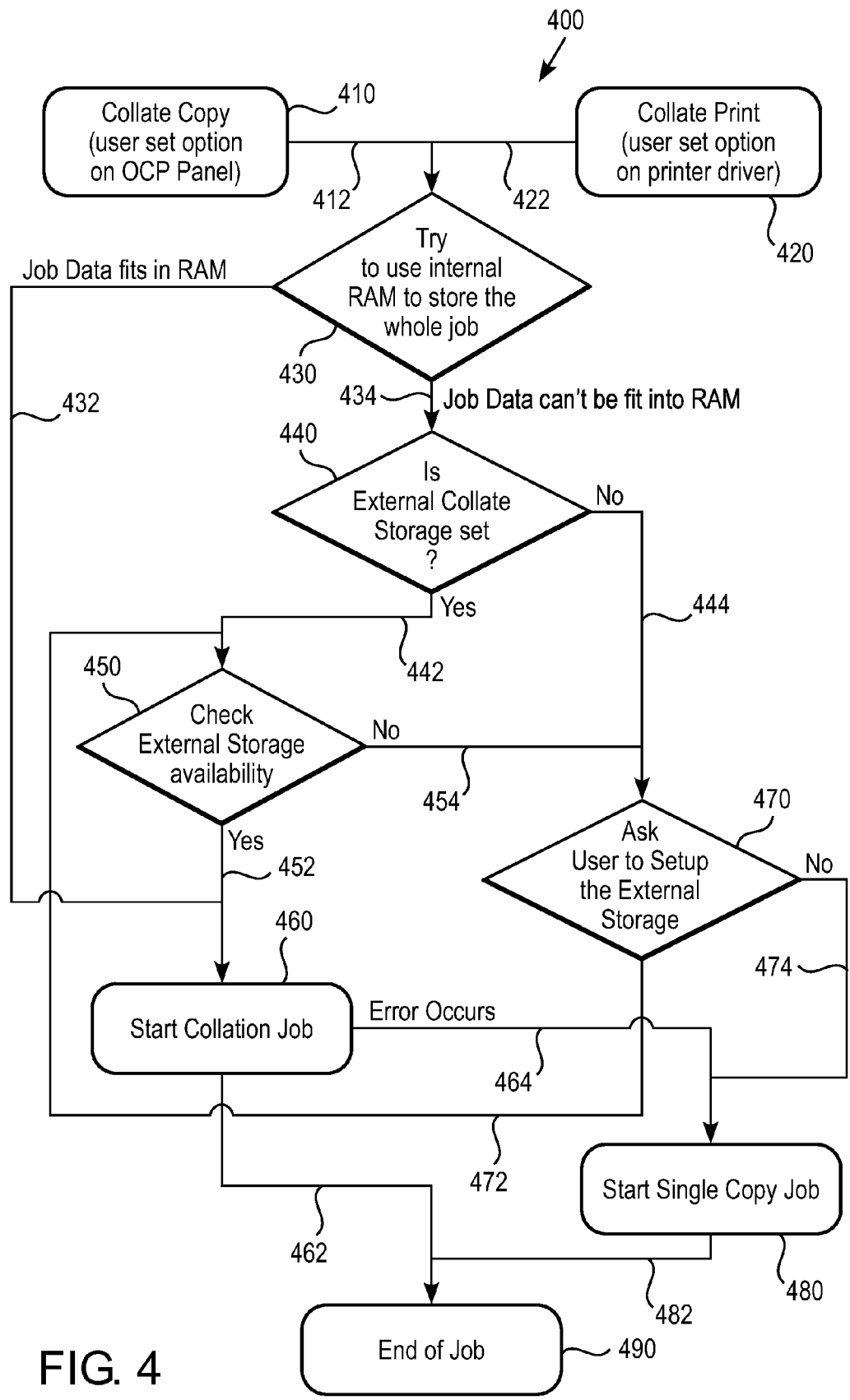
FIG. 4 is a flow chart of an image forming apparatus having full collation by using an external storage system in accordance with a further exemplary embodiment.

FIG. 4 is a flow chart of a method implemented in a data processing system including an image forming apparatus for producing a print job, which includes a collated print and/or copy request in accordance with another exemplary embodiment. As shown in FIG. 4, the image forming apparatus receives a request for multiple copies of the document via either a collate copy 410 (i.e., user set option on the OCP Panel), or alternatively a collate print 420 (i.e., user set option on the printer driver). It can be appreciated that the data and the job information can be received from a host computer connected to the image forming apparatus, or alternatively, an original hard copy of the document on the image forming apparatus to generate the data representing the document to be printed, and the job information can be received from an input panel of the image forming apparatus.

The image forming apparatus receives the data representing the document to be printed in the print job and job information about the print job, including an instruction to print multiple copies of the document (steps 412, 422). The firmware associated with the image forming apparatus determines in step 430 if the data representing the document to be printed can be stored in its entirety within the internal memory (or internal RAM) of the image forming apparatus, and if the internal memory does not have sufficient memory to store the print job data, based on the receipt of the request to print multiple copies, (i.e., collation) the entire print job data is forwarded to an external storage unit. If the data fits into the internal memory of the image forming apparatus, the print job is sent via step 432 to the print controller for printing of the collated print job.

Alternatively, as set forth above, if the print job and data associated therewith does not fit within an internal memory of the image forming apparatus, based upon receipt of the request to print multiple copies of the document, the entire the print job is sent via step 434 to the firmware of the image forming apparatus to ascertain in step 440, if an external storage unit (or external collate storage device) has been set (i.e., pre-selected) for the image forming apparatus. If, an external storage unit has been pre-selected by the image forming apparatus, the print job data is sent via step 442 to the external storage unit or device where the available external storage (or memory) within the external storage unit or device is checked, step 450. If the external storage unit has available storage, the print job data is sent to the external storage unit in step 452, where the print job data is stored until the entire print job data has been received. Once the entire print job has been transferred to the external storage unit, the data from the external storage unit is sent to the printer controller, so that the multiple copies of the document can be printed in step 460.

If an external storage unit or device has not be pre-selected or set within the firmware of the image forming apparatus, in step 444, the user is asked in step 470 to select an external storage unit. In accordance with an exemplary embodiment, the external storage unit is selected from at least one and/or one or more external storage units available to the image forming apparatus. The selection of the external storage unit is preferably performed by a software wizard or other suitable method. Once the external storage unit has been selected, in step 472, the print job data is sent to the external storage unit or device where the available external storage within the external storage unit or device is checked, step 450. If the external storage unit has available storage, the print job data is sent to the external storage unit in step 452, where the print job data is stored until the entire print job data has been received. Alternatively, if the external storage unit does not have the capacity or available memory, in step 454, the user will be asked to select an alternative external storage unit. Once the entire print job has been transferred to the external storage unit, the data from the external storage unit is sent to the printer controller so that the multiple copies of the document can be printed, step 460.

In accordance with an exemplary embodiment, if an external storage unit is not available, or alternatively, the external storage unit does not have available memory to store the data for the print job, in step 474, a single copy and/or print job is preformed. In addition, if an error is detected upon printing of the collated job, in step 464, the firmware will print a single copy of the print job. Once the collation print job (step 462) or the single print job (step 482) has been completed, the print job is completed (step 490), i.e., end of job.

Figure 5:
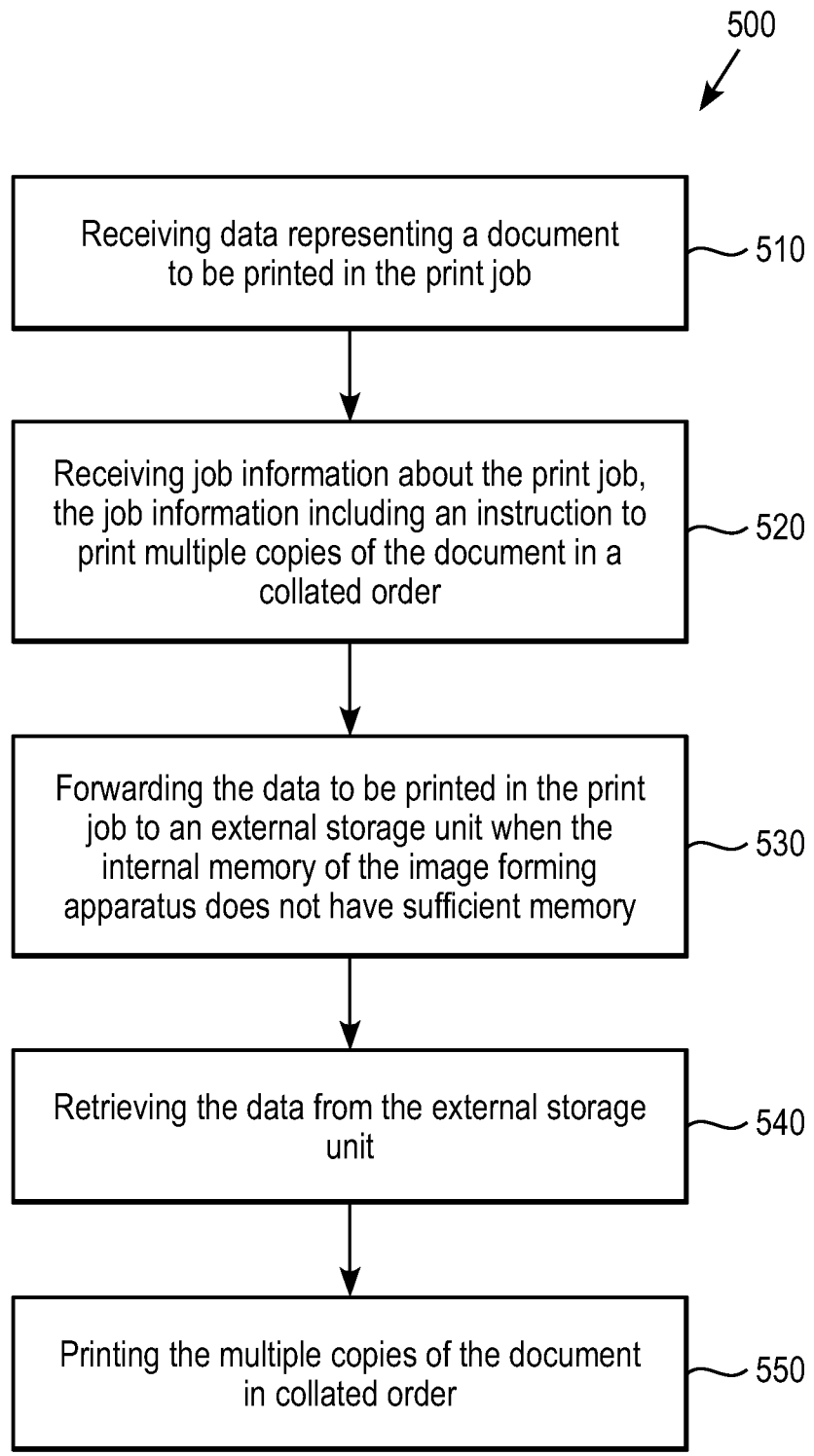
FIG. 5 is a flow chart of an image forming apparatus having full collation by using an external storage system in accordance with another exemplary embodiment.

In accordance with another exemplary embodiment as shown in FIG. 5, a method implemented in a data processing system including an image forming apparatus for producing a print job 500 comprises the steps of: (a) receiving data representing a document to be printed in the print job 510; (b) receiving job information about the print job, the job information including an instruction to print multiple copies of the document in a collated order 520; (c) forwarding the data to an external storage unit when an internal memory of the image forming apparatus does not have sufficient memory to store the data representing the print job 530; (d) retrieving the data from the external storage unit 540; and (e) printing the multiple copies of the document in collated order 550.

Figure 6:
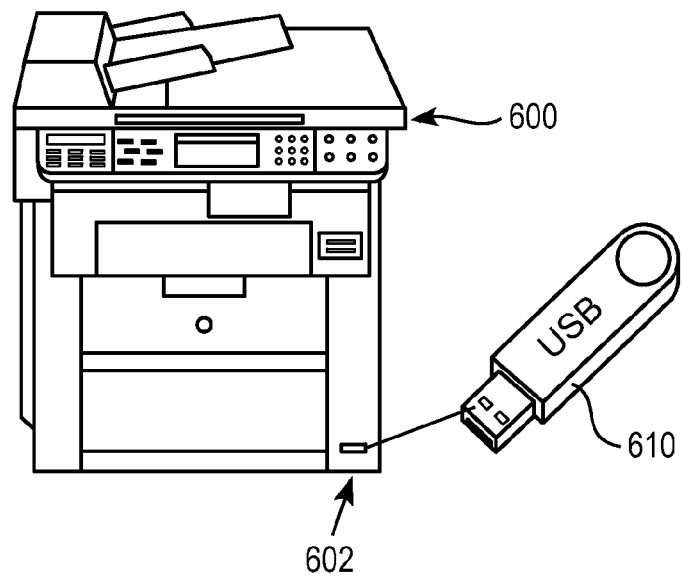
FIG. 6 is an illustration of an external storage unit in the form of a USB flash drive in accordance with an exemplary embodiment.

FIG. 6 is an illustration of an external storage unit in the form of a USB flash drive in accordance with an exemplary embodiment. As shown in FIG. 6, in accordance with an exemplary embodiment, if the image forming apparatus (or printer) 600 has a USB (Universal Serial Bus) host 602, a USB mass storage device (e.g. USB Flash Drive) 610 can be attached to the image forming apparatus 600, and the storage space (or memory) of the USB mass storage device 610 can be used for storing the temporary collation faces during collation. In accordance with another exemplary embodiment, a compression (or compression step) can be applied to the face of each sheet (or image) so that additional collation faces can be stored.

Figure 7:
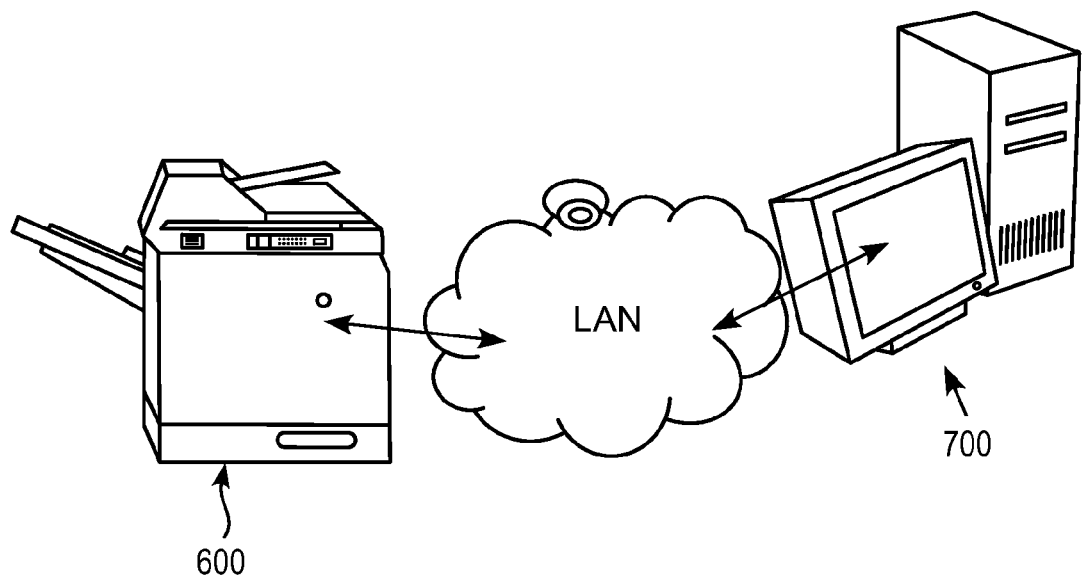
FIG. 7 is an illustration of an external storage unit in the form of a collation server in accordance with another exemplary embodiment.

In accordance with another exemplary embodiment, a collation server based external storage device can be used. As shown in FIG. 7, in accordance with an exemplary embodiment, a FTP based external storage device 700 can provide temporary storage that is required by the collation. In accordance with an exemplary embodiment, the image forming apparatus (or printer) 700 stores each face on the specified FTP Server first, and then retrieves them later for collation. Once the job is done, those temporary face files can be removed from the FTP Server. It can be appreciated that a faster network connection between the image forming apparatus (or printer) 500 and the specified FTP Server is preferred, however, any suitable network connection can be used. In accordance with another embodiment, a SMB based external storage service can be used, instead of and in place of the FTP Server.

It can be appreciated that one advantage of using either a FTP or a SMB service as an external service is the popularity of the Internet. For example, a user needs only to specify the parameters on the image forming apparatus (or printer) and setup/arrange for those services in the LAN (Local Area Network) 710. In accordance with an exemplary embodiment, a collation server software which runs on a user's PC (personal computer)/client/host device can be implemented, which pairs the external storage unit 700 with the image forming apparatus (or printer) 600 within the same subnet, such that no configuration is necessary.

Figure 8:
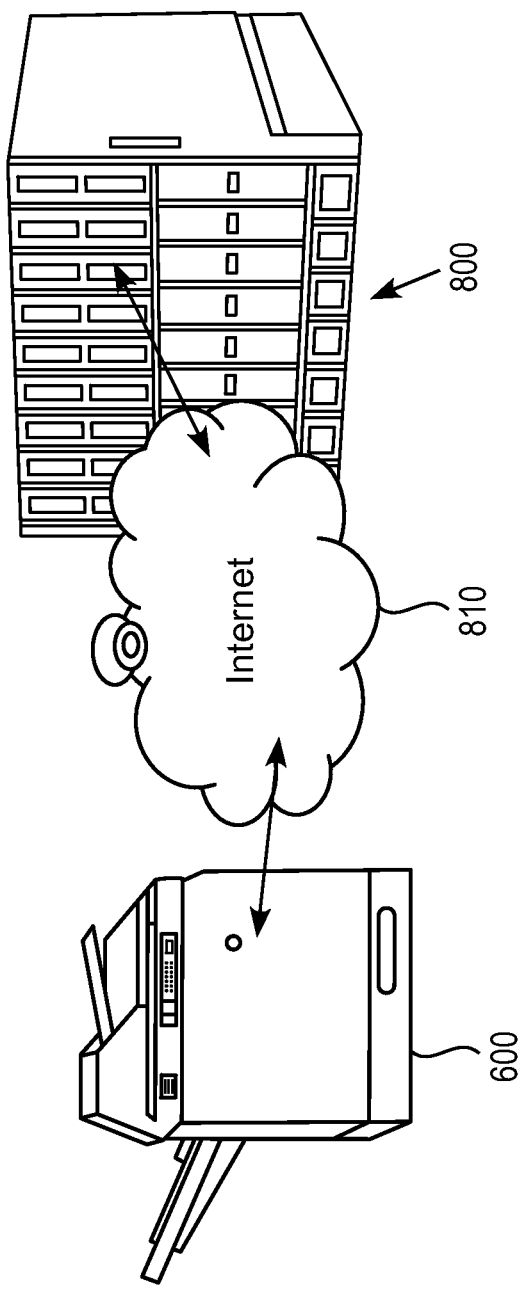
FIG. 8 is an illustration of an Internet based external storage unit in accordance with a further exemplary embodiment.

In accordance with another exemplary embodiment, an Internet based external storage unit can be used as shown in FIG. 8. As shown in FIG. 8, a collation server 800 can be provided by the manufacture of the image forming apparatus (or printer) 600, and using an available Internet connection 810 with the image forming apparatus (or printer) 600, the collation feature can be available to one or more users. In accordance with an exemplary embodiment, the available Internet connection 810 is a broadband connection, however, it can be appreciated that other Internet connections 810 can be used. In addition, it can be appreciated that in this embodiment, the image forming apparatus 600 can be configured such that a particular URL automatically connects the image forming apparatus 600 to the collation storage device (or server) 800, (e.g. http://collate.konicaminolta.us/magicolor4690MF).

In accordance with another exemplary embodiment, a computer program product comprising a non-transitory computer usable medium having a computer readable code embodied therein for controlling an image forming apparatus, the computer readable program code configured to cause the image forming apparatus to execute a process for producing a print job, the process comprising the steps of: (a) receiving data representing a document to be printed in the print job; (b) receiving job information about the print job; (c) determining if the job information includes an instruction to print multiple copies of the document in a collated order; (d) forwarding the data representing the document to be printed in the print job to an external storage unit when multiple copies of the document in collated order have been requested; (e) retrieving the data from the external storage unit; and (f) printing the multiple copies of the document in collated order.

It can be appreciated that the process and method as described herein, can be introduced into the image forming apparatus by updating the firmware in the non-volatile memory of the image forming apparatus. In this regard, the method may be brought to the apparatus in a form of a package of install software and the firmware, which may be divided and/or compressed so that the install software effectively installs the firmware. The package may be steadily stored in a computer readable diskette, such as a compact disk, or may be transmitted through a wire/wireless communication line.

The method described above can be used to print on paper or other suitable printing medium such as thin plastic sheets, etc. The computer readable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

While a print job is described in detail above, the method and process can also be applied to a copy job, where a user supplies an original hard copy. Thus, as used in this disclosure and the appended claims, the term "image forming apparatus", "printer" or "printing device" should be broadly understood to refer to any machine that has a print function, including printers, copiers, and all-in-one machines which have printing, scanning and copying functions. The term "printing" and "print job" similarly includes both printing and copying, i.e., it refers to producing images on a recording medium either from a data received from an external device such as a host computer or from data generated by scanning an original hard copy.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method implemented in a data processing system including an image forming apparatus for producing a print job, comprising:
    (a) receiving data representing a document to be printed in the print job;
    (b) receiving job information about the print job, the job information including an instruction to print multiple copies of the document in a collated order;
    (c) forwarding the data in its entirety to an external storage unit when an internal memory of the image forming apparatus does not have sufficient memory to store the data representing the print job;
    (d) sending the data from the external storage unit to a printer controller of the image forming apparatus for printing;
    (e) printing the multiple copies of the document in collated order; and if an error is detected upon printing of the multiple copies of the document, printing a single copy of the print job.

2. The method of claim 1, further comprising checking the external storage unit for availability to store the data representing the print job to be printed before forwarding the data to the external storage unit.

3. The method of claim 1, wherein if at least one external storage unit is not available to the image forming apparatus, printing a single copy of the print job.

4. The method of claim 1, further comprising determining if the data representing the document to be printed can be stored in its entirety within the internal memory of the image forming apparatus.

5. The method of claim 4, wherein if the data representing the document to be printed can be stored in its entirety within the internal memory of the image forming apparatus, storing the data representing the print job within the internal memory of the image forming apparatus.

6. The method of claim 4, wherein if the data representing the document to be printed cannot be stored in its entirety within the internal memory of the image forming apparatus, selecting the external storage unit from at least one external storage unit available to the image forming apparatus.

7. The method of claim 1, wherein in steps (a) and (b), the data and the job information are received from a host computer connected to the image forming apparatus.

8. The method of claim 1, wherein step (a) includes scanning an original hard copy of the document on the image forming apparatus to generate the data representing the document to be printed, and wherein step (b) includes receiving the job information from an input panel of the image forming apparatus.

9. The method of claim 1, further comprising a firmware application within the image forming apparatus, which controls steps (a) - (e).

10. The method of claim 1, further comprising converting the data representing a document to be printed in the print job from an original print format to a storage format.

11. The method of claim 1, comprising:
    selecting the external storage unit from one or more external storage units available to the image forming apparatus if the external storage unit has not been pre-selected.

12. The method of claim 1, comprising:
    pre-selecting the external storage unit for the image forming apparatus; and
    selecting an alternative external storage unit if the pre-selected external storage unit does not have sufficient memory.

13. The method of claim 1, comprising:
   selecting the external storage unit from one or more external storage units; and
   storing an identity of the selected storage unit within firmware of the image forming apparatus.

14. The method of claim 1, wherein the error is the external storage unit having insufficient memory capacity.

15. The method of claim 1, wherein the error is the external storage unit being unavailable.

* * * * *